(12) United States Patent
Asano et al.

(10) Patent No.: US 6,440,559 B1
(45) Date of Patent: Aug. 27, 2002

(54) GRANULAR POLYTETRAFLUOROETHYLENE POWDERS AND PROCESS FOR PRODUCING THE SAME

(75) Inventors: Michio Asano; Kazuya Kawahara, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/403,521

(22) PCT Filed: Apr. 17, 1998

(86) PCT No.: PCT/JP98/01794

§ 371 (c)(1), (2), (4) Date: Oct. 22, 1999

(87) PCT Pub. No.: WO98/47950

PCT Pub. Date: Oct. 29, 1998

(30) Foreign Application Priority Data

Apr. 24, 1997 (JP) .............................................. 9-107834

(51) Int. Cl.⁷ ................................................. B32B 5/16
(52) U.S. Cl. ..................... 428/402; 428/403; 428/407; 523/335; 524/546; 264/117
(58) Field of Search ............................... 428/402, 403, 428/407; 264/117; 524/546; 523/335

(56) References Cited

U.S. PATENT DOCUMENTS

| | | | |
|---|---|---|---|
| 3,766,133 A | * 10/1973 | Roberts | |
| 3,882,217 A | * 5/1975 | Banham | ...... 264/117 |
| 5,182,119 A | 1/1993 | Edens | ...... 425/222 |
| 5,216,068 A | * 6/1993 | Zipplies | ...... 524/546 |

FOREIGN PATENT DOCUMENTS

| | | |
|---|---|---|
| GB | 1369 980 | 10/1974 |
| GB | 1369980 | * 10/1974 |
| JP | 54-17782 | 7/1979 |
| JP | 3-255133 | 11/1991 |
| JP | 8-208929 | 8/1996 |
| JP | 9-52955 | 2/1997 |
| JP | WO97/1111 | 3/1997 |

OTHER PUBLICATIONS

European Search Report dated Aug. 9, 2000.

* cited by examiner

*Primary Examiner*—Leszek Kiliman
(74) *Attorney, Agent, or Firm*—Armstrong, Westerman & Hattori, LLP

(57) ABSTRACT

To provide a filler-containing or non-filler-containing polytetrafluoroethylene granular powder having a high apparent density, a small electrostatic charge and a superior powder flowability and giving a molded product which is free from lowering of tensile strength and elongation and coloring attributable to the surfactant and has a high degree of whiteness, and a process for preparing the same. The granulation is carried out by wetting 100 part by weight of a polytetrafluoroethylene powder or a mixture of polytetrafluoroethylene powder and filler with 30 to 60 parts by weight of an aqueous solution containing a nonionic surfactant having a hydrophobic segment comprising a poly(oxyalkylene) unit having 3 or 4 carbon atoms and a hydrophilic segment comprising a poly(oxyethylene) unit and then applying a mechanical force to the wetted polytetrafluoroethylene powder or the wetted mixture of polytetrafluoroethylene powder and filler.

14 Claims, 2 Drawing Sheets

GRANULAR POLYTETRAFLUOROETHYLENE POWDERS AND PROCESS FOR PRODUCING THE SAME

TECHNICAL FIELD

The present invention relates to a polytetrafluoroethylene (PTFE) granular powder, a filler-containing PTFE granular powder and preparation processes thereof. Those granular powders are useful as a molding material, have a high apparent density and low electrostatic charge and give a molded article having a high whiteness.

BACKGROUND ART

Hitherto, as a process for preparing a PTFE granular powder, a process for stirring in water containing an organic solvent, a process for stirring in hot water and a process for applying a mechanical force (tumbling) to a powder wetted with a small amount of water are known. Among those processes, as a process for tumbling in a wet state, for example, there is known a process for forming a powder into a slurry with the use of an organic liquid and then tumbling the slurry while heating up near a boiling temperature of the organic liquid (JP-B-45-9071).

However, the above-mentioned processes have problems such that an organic liquid used is inflammable and harmful to human body and further that equipment cost for carrying out the processes becomes high.

On the contrary, as a process for preparing a filler-containing PTFE granular powder, for example, there are a process disclosed in JP-B-44-22619, in which stirring is carried out in water in the presence of an organic liquid, a process disclosed in JP-B-44-22620, in which a PTFE powder and a filler are formed into a slurry with the use of an organic liquid and then tumbling of the slurry is carried out, and the like process. However, the processes disclosed in each of the above-mentioned patent publications have problems such that an organic liquid used is inflammable and harmful to human body and further that equipment cost for carrying out the processes becomes high.

On the other hand, with respect to a process without using an organic liquid, there is, for example, a process disclosed in JP-A-3-259925, in which a PTFE powder is stirred in water in the absence of an organic liquid. In such a. process using water only, since an apparent density of an obtained PTFE granular powder does not become high, post-treatment becomes necessary.

With respect to other process without using an organic liquid, there is, for example, a process disclosed in JP-B-54-17782, in which a PTFE powder is wetted with a specified amount of an aqueous solution containing a volatile nonionic surfactant and then subjected to tumbling. In the process disclosed in that patent publication, an apparent density of a granular powder is low and excellent flowability cannot be obtained. Also since much amount of a nonionic surfactant is used and removal of it is difficult, it remains in a molded article, which results in causing problems such that mechanical properties of the molded article are lowered and that the surfactant is decomposed due to heat in a molding step, thereby causing coloring of the molded article.

Further a process employing an ionic surfactant instead of the above-mentioned nonionic surfactant can be considered. However when a PTFE granular powder obtained by such a process is molded, a residue (for example, a metal salt) of the decomposed ionic surfactant is generated in the sintering step. The residue is difficult to remove, and has been considered to have problems of causing coloring of the molded article and lowering of mechanical properties of the molded article.

Also the PTFE powder is easy to be electrostatically charged, and thus when mixing, stirring and tumbling steps are carried out for granulation, there occurs electrostatic charge of not less than 50 V due to static electricity. Thus electrostatically charged PTFE powder, when molded, adheres to not only a mold die but also a hopper, feeder, etc. due to static electricity, which results in lowering of flowability.

The present inventors have made intensive studies in view of the above-mentioned problems, and as a result, have found that when granulating a PTFE powder or a mixture powder of a PTFE powder and a filler by applying thereto a mechanical force such as tumbling, use of a specific nonionic surfactant can solve the above-mentioned problems.

Namely an object of the present invention is to provide a process for preparing, without necessity of using an organic liquid, a PTFE granular powder which has a high apparent density, a small electrostatic charge and excellent powder flowability and gives a molded article having a high whiteness and being free from lowering of mechanical properties such as elongation and coloring as mentioned above.

DISCLOSURE OF THE INVENTION

The present invention relates to a process for preparing a PTFE granular powder or a filler-containing PTFE granular powder by granulation of a PTFE powder or a mixture powder of a PTFE powder and a filler; characterized in that 100 parts (part by weight, hereinafter the same) of the PTFE powder or the mixture powder is wetted with 30 to 60 parts of an aqueous solution containing a nonionic surfactant having a hydrophobic segment comprising a poly(oxyalkylene) unit having 3 or 4 carbon atoms and a hydrophilic segment comprising a poly(oxyethylene) unit and then a mechanical force is applied to the wetted PTFE powder or the wetted mixture powder.

Further the present invention relates to a PTFE granular powder obtained by the above-mentioned process, which is characterized in that an apparent density of the granular powder is not less than 0.60 g/ml; flowability of the granular powder is not less than 6 times; an average particle size of the particles in the granular powder is from 400 to 1,000 μm; and an electrostatic charge of the granular powder is not more than 50 V.

BEST MODE FOR CARRYING OUT THE INVENTION

Figure 1:
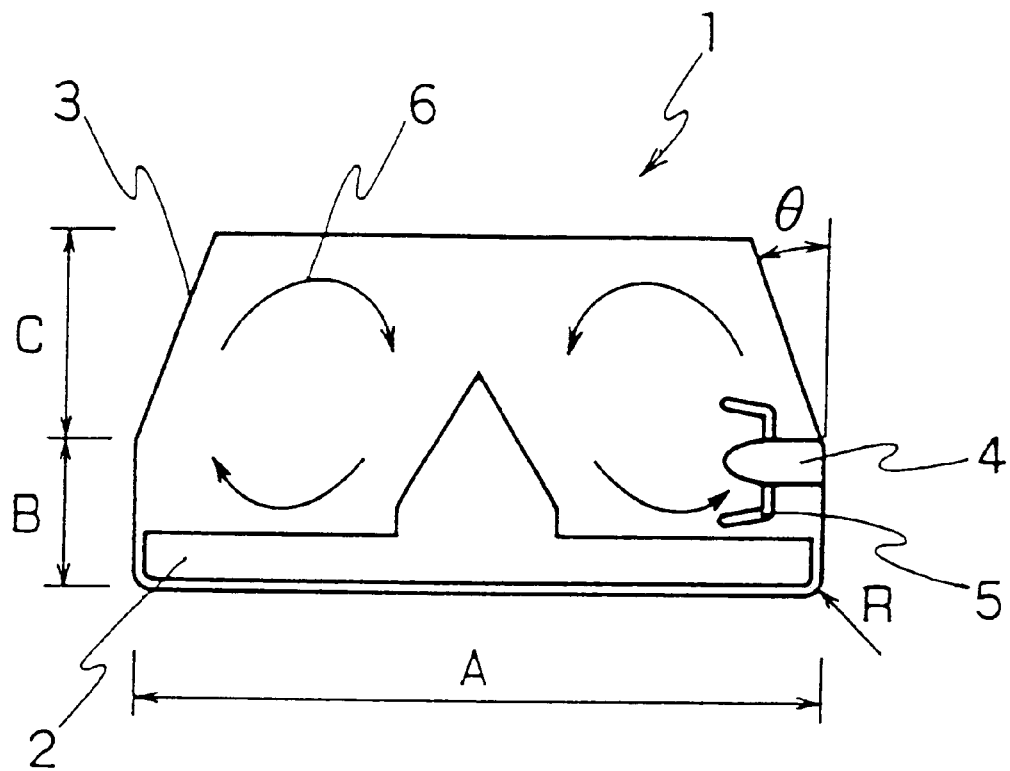
FIG. 1 is a diagrammatic cross-sectional view for explaining a rotating disc type granulator used in the preparation process of the present invention.

A major feature of the preparation process of the present invention is to wet the PTFE powder or the mixture powder of the PTFE powder and filler with an aqueous solution containing a specific nonionic surfactant.

In the present invention, the meaning of the wetting encompasses a state that when the aqueous solution containing a surfactant is added to the PTFE powder or the mixture powder of the PTFE powder and filler, the PTFE powder or the mixture powder gets wet and does not separate from the aqueous solution containing a surfactant.

In the present invention, by using the above-mentioned specific nonionic surfactant, there can be obtained effects that a high apparent density, a small electrostatic charge and excellent flowability are given to the obtained PTFE granular powder and that a molded article obtained by molding the granular powder is free from lowering of tensile strength and elongation and coloring attributable to the surfactant and has a high whiteness.

The nonionic surfactant used in the present invention is a surfactant having a hydrophobic segment comprising poly(oxyalkylene) unit having 3 or 4 carbon atoms and a hydrophilic segment comprising poly(oxyethylene) unit. Examples thereof are, for instance, segmented polyalkylene glycols represented by the following formula (I):

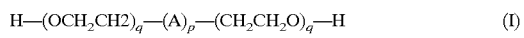

$$H\text{—}(OCH_2CH2)_q\text{—}(A)_p\text{—}(CH_2CH_2O)_q\text{—}H \quad (I)$$

wherein A is

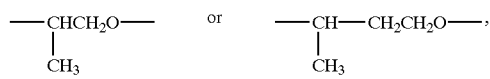

p is an integer of 5 to 200, q is an integer of 2 to 400. From the viewpoint of being easily adsorbed in the PTFE resin, it is preferable that p is from 15 to 40 and q is from 7 to 100.

Among them, preferable are amine oxides, polyoxyethylene alkyl phenyl ethers and segmented polyalkylene glycols, and further preferable are polyoxyethylamine oxide and

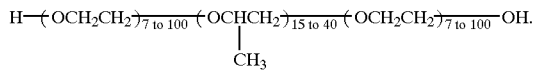

An adding amount of the above-mentioned nonionic surfactant is from 0.1 to 5%, preferably from 0.5 to 2.0% on the basis of the PTFE powder (or mixture powder).

By using the nonionic surfactant in the above-mentioned range, there can be obtained a granular powder having a high whiteness, a small electrostatic charge, an excellent powder flowability and a high apparent density.

In the present invention, as the surfactant, an anionic surfactant may be used in combination with the specific nonionic surfactant. In case of the combination use of the anionic surfactant with the nonionic surfactant, an amount of the anionic surfactant is from 0.01 to 5% on the basis of the PTFE powder (or the mixture powder) (In case of the combination use, an amount of the nonionic surfactant is the same as above).

Examples of the anionic surfactant are known ones, for instance, higher fatty acid and its salt, alkyl sulfate, alkyl sulfonate, alkyl aryl sulfonate, alkyl phosphoric acid ester and the like. Particularly preferable anionic surfactant is a sulfate of higher alkyl alcohol, for example, sodium lauryl sulfate or a fluorine-containing sulfonic acid type- or fluorine-containing carboxylic acid type-anionic surfactant having a fluoroalkyl group or chlorofluoroalkyl group. The typical compounds thereof are those represented by the formula (II):

$$X(CF_2CF_2)n(CH_2)mA \quad (II)$$

or the formula (III):

$$X(CF_2CFCl)n(CH_2)mA \quad (III)$$

wherein X is hydrogen atom, fluorine atom or chlorine atom, n is an integer of 3 to 10, m is 0 or an integer of 1 to 4, A is carboxyl group, sulfonic acid group or an alkali metal or ammonium salt thereof.

The PTFE powder used in the present invention is prepared by usual suspension polymerization, and preferable is, for example, a powder comprising homopolymer of tetrafluoroethylene (TFE) or a copolymer of TFE and a monomer copolymerizable with TFE. An average particle size after the pulverization is not larger than 200 μm, preferably not larger than 50 μm, and a lower limit thereof is defined by a pulverizing apparatus and pulverizing technique. The powder has a water content of 0 to 30% by weight after drying.

Examples of a pulverizing machine used for the above-mentioned pulverization are a hammer mill, crusher equipped with a rotor having blades, jet mill, impact mill and the like.

As the monomer copolymerizable with TFE, there are, for example, a perfluoro(vinyl ether) represented by the formula (IV):

$$CF_2=CF\text{—}OR_f \quad (IV)$$

wherein $R_f$ is a perfluoroalkyl group having 1 to 10 carbon atoms, a perfluoro(alkoxyalkyl) group having 4 to 9 carbon atoms, an organic group represented by the formula (V):

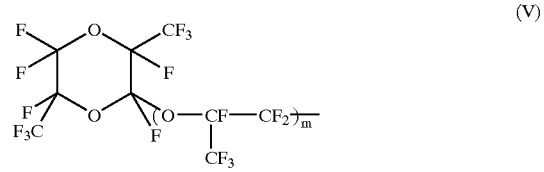

in which m is 0 or an integer of 1 to 4, or an organic group represented by the formula (VI):

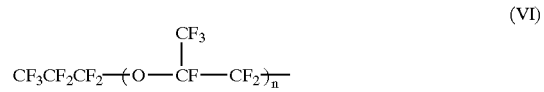

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an effect of making creep resistance excellent can be obtained with maintaining the property of being not-melt-processable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, creep resistance of a molded article obtained from the granular powder can be improved.

The use of the above-mentioned PTFE powder particles having the average particle size in the above-mentioned range gives such effects that the granular powder obtained through granulation is easily handled, that is, having a small electrostatic charge, a good powder flowability and a high apparent density, and in addition, the molded articles obtained from the granular powder have good physical properties.

In the present invention, the above-mentioned matter can also be applied to the PTFE mixture powder containing a filler. In case where a hydrophilic filler is used, there is a drawback such that due to its hydrophilic property, the filler is difficult to be mixed with the PTFE powder homogeneously, that is, the granular powder in which the whole of the filler used is mixed with the PTFE powder cannot be obtained. This phenomenon is so-called the separation of filler.

To cope with that problem, there is employed a method of previously surface-treating a hydrophilic filler for making it hydrophobic to lower its surface activity near the surface activity of particles of the PTFE powder and then mixing with the PTFE powder or the like method.

As the compound known as one used for the above-mentioned surface treatment, there are (a) a functional amino-containing silane and/or a soluble silicone (JP-A-51-548, JP-A-51-549, JP-A-4-218534), (b) a monocarboxylic acid of hydrocarbon having 12 to 20 carbon atoms (JP-B-48-37576), (c) a chromium complex compound of an aliphatic carboxylic acid (JP-B-48-37576), (d) a silicone (JP-A-53-139660), etc. and (e) a method of coating a hydrophilic filler with PTFE (JP-A-51-121417) is also known.

Examples of the above-mentioned compound used for the surface treatment of the hydrophilic filler are, for instance, aminosilane coupling agents such as γ-aminopropyltriethoxysilane ($H_2N(CH_2)_3Si(OC_2H_5)_3$), m- or p-aminophenyltriethoxysilane ($H_2N-C_6H_4-Si(OC_2H_5)_3$), γ-ureidopropyltriethoxysilane ($H_2NCONH(CH_2)_3Si(OC_2H_5)_3$, N-(β-aminoethyl)-γ-aminopropyltrimethoxysilane ($H_2N(CH_2)_2NH(CH_2)_3Si(OCH_3)_3$) and N-(β-aminoethyl)-γ-aminopropylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol.

A filler having water-repelling property can be used as it is.

Examples of the above-mentioned filler are, for instance, one or more of glass fiber powder, graphite powder, metal fibers or metal powders such as bronze powder, gold powder, silver powder, copper powder, stainless steel powder, stainless steel fiber powder, nickel powder and nickel fiber powder; inorganic fibers or inorganic powders such as molybdenum disulfide powder, fluorinated mica powder, coke powder, carbon fiber powder, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber powder and graphite powder, glass fiber powder and molybdenum disulfide powder, bronze powder and molybdenum disulfide powder, bronze powder and carbon fiber powder, graphite powder and coke powder, graphite powder and heat-resistive aromatic resin powder, carbon fiber powder and heat-resistive aromatic resin powder or the like. The mixing method may be either of wet method or dry method.

It is preferable that the above-mentioned filler has an average particle size or an average fiber length of 10 to 1,000 μm.

It is preferable that the proportion of the filler is from 2.5 to 100 parts, further preferably from 5 to 80 parts on the basis of 100 parts of the PTFE powder.

According to the present invention, the obtained molded article has a PTFE portion having higher whiteness (Z value) as compared with that of conventional molded articles, and the whiteness of not less than 80, particularly not less than 95 can be achieved. Therefore when a white or transparent filler is used, PTFE molded articles containing a filler which have a higher whiteness (Z value) can be obtained. Example of the white or transparent filler are, for instance, glass fiber, boron nitride powder, titanium oxide powder and the like Explained below is the preparation process of the present invention by using the PTFE powder alone. The substantially same preparation process can be applied to the mixture powder of the PTFE powder and filler.

In the present invention, examples of the method for applying a mechanical force are, for instance, a tumbling method, a stirring method, etc.

The tumbling used in the present invention means that the PTFE particles rotate and move around in the granulator while the particles are rubbed with each other or brought into contact to inner side walls of the granulator. Examples of the granulator used for granulation by tumbling the PTFE powder are, for instance, a rotating disc type granulator, V blender, C blender, a granulator with a rotating side plate and a rotating inclined disc, etc.

Figure 2:
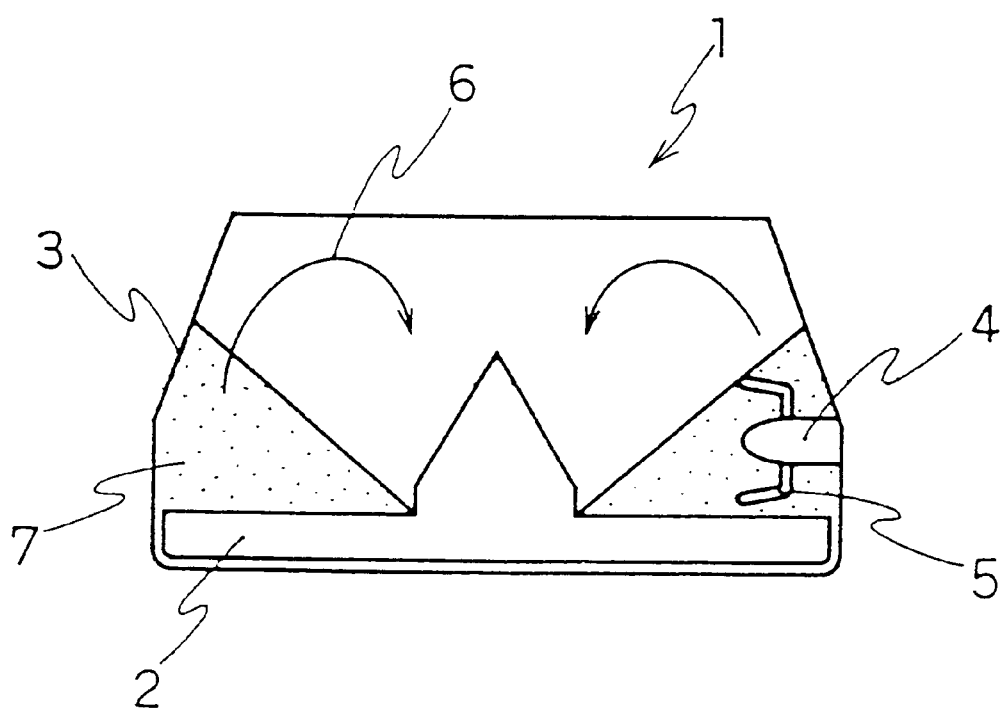
FIG. 2 is a diagrammatic cross-sectional view for explaining a rotating disc type granulator used in the preparation process of the present invention.

FIGS. 1 and 2 are diagrammatical cross-sectional views for explaining rotating disc type granulators which can be used in the process of the present invention.

In FIG. 1, numeral 1 represents a rotating disc type granulator comprising a rotating disc 2, a side plate 3 and a pulverizer 4 with chopper blades 5. The side plate 3 comprises a portion B being at a right angle to the rotating disc 2 and a conical portion C inclined inward at an angle of θ. A represents a diameter of the bottom of the granulator.

Well-balanced design of these components can make smooth a flow 6 of the PTFE powder. As such a granulator, there is known, for example, High Speed Mixer FS- 10 available from Fukae Kogyo Kabushiki Kaisha. The position and size of the pulverizer 4 have great effect on the mixing, tumbling and granulation of the PTFE powder. The nearest distance between the chopper blade 5 and the rotating disc 2 is 2 to 3 mm. All of the powders dispersed in a vessel strike on the chopper blade 5 so that an irregular agglomerate produced at the time of the granulation can be pulverized.

When granulating by adding a liquid, since a particle size of the granulated powder is determined by the number of rotations of the pulverizer 4, the pulverizer is of non-stage transmission type by employing an inverter.

Even if the number of rotations of the rotating disc 2 is constant, there is no problem. The number of rotations may be set properly so that the flow 6 of the powder is in good condition as shown in FIG. 2.

In FIG. 2, numerals 1 to 6 are the same as above. Numeral 7 represents a PTFE powder.

A peripheral speed of the rotating disc 2 varies depending on kind of the powder. A suitable speed is from about 5 m/second to about 10 m/second.

Examples of the process for preparing the PTFE granular powder of the present invention are, for instance, the following process, etc.

The above-mentioned rotating disc type granulator (capacity: 10 liters) is charged with 1,000 g of a PTFE powder, and the rotating disc and pulverizer are rotated at 600 to 800 rpm and 4,000 to 4,600 rpm, respectively to mix the powder uniformly over 5 to 10 minutes.

Then while maintaining the above-mentioned number of rotations, 400 to 1,500 ml of an aqueous solution containing 0.3 to 1% by weight of a specific nonionic surfactant is added over 2 to 5 minutes and is made compatible with the powder over 0.5 to 3 minutes.

Subsequently the number of rotations of the rotating disc and pulverizer is adjusted to 50 to 800 rpm and 50 to 200 rpm, respectively and a jacket is steam-heated to heat a product in the granulator to a temperature in the range of 70° to 75° C. over 10 to 30 minutes, followed by tumbling for 0 to 20 minutes for granulation. The granulation carried out in the manner mentioned above makes the apparent density of the granular powder higher and the shape of particles in the powder spherical.

Then the product is taken out and dried at 165° C. for 16 hours in an electric oven to give the PTFE granular powder of the present invention.

In the above-mentioned preparation process, the granular powder giving, for example, the following physical properties of the powder and molded article can be obtained.

Apparent density: not less than 0.60 g/ml
Flowability: 6 to 8 times
Average particle size: 400 to 1,000 $\mu$m
Tensile strength: 100 to 400 kgf/cm$^2$
Elongation: 100 to 500%
Electrostatic charge: not more than 50 V
Whiteness (Z value): not less than 80

Conditions for the process for preparing the PTFE granular powder of the present invention are, for example, as follows.

| | |
|---|---|
| (A) PTFE powder | 100 parts |
| (B) Aqueous solution containing a specific nonionic surfactant (concentration: 0.3 to 8%) | 30 to 60 parts |

Those conditions are advantageous from the viewpoint of flowability of the granular powder.

More preferable conditions are:

| | |
|---|---|
| (A1) PTFE powder | 100 parts |
| (B1) Aqueous solution containing a nonionic surfactant shown in the above-mentioned formula (I) (1.0 to 4%) | 40 to 50 parts |

Those conditions are advantageous from the viewpoint of flowability of the granular powder.

More preferable conditions are:

| | |
|---|---|
| (A1) PTFE powder | 100 parts |
| (C1) Glass fiber powder or carbon fiber powder | 10 to 30 parts |
| (B1) Aqueous solution containing a nonionic surfactant shown in the above-mentioned formula (I) (concentration: 1.0 to 4%) | 40 to 50 parts |

Those conditions are advantageous from the viewpoint of an apparent density, particle size distribution and whiteness of the granular powder.

In case of the filler-containing granular powder, the following physical properties of the powder and molded article are given.

Apparent density: not less than 0.60 g/ml
Flowability: 6 to 8 times
Average particle size: 400 to 1,000 $\mu$m
Tensile strength: 100 to 400 kgf/cm$^2$
Elongation: 100 to 500%
Electrostatic charge: not more than 50 V
  (in case of using a glass fiber)
Whiteness (Z value): not less than 80
  (in case of a white or transparent filler such as a glass fiber)

Conditions for the process for preparing the filler-containing PTFE granular powder of the present invention are, for example, as follows.

| | |
|---|---|
| (A) PTFE powder | 100 parts |
| (C) Filler | 5 to 40 parts |
| (B) Aqueous solution containing a specific nonionic surfactant (concentration: 0.3 to 8%) | 30 to 60 parts |

Those conditions are advantageous from the viewpoint of an apparent density, particle size distribution and whiteness of the granular powder.

The present invention is then explained based on experimental examples, but is not limited to them.

EXPERIMENTAL EXAMPLES 1 and 2

A 6-liter Irich Reverse Flow Type High Speed Mixer Model RO2 being available from Nippon Irich Co., Ltd. and used as a granulator with a rotating side plate and a rotating inclined disc (angle of a bottom disc to a horizontal level: 30 degrees) was charged with 1,200 g of a PTFE powder (POLYFLON M-111 available from DAIKIN INDUSTRIES, LTD., modified PTFE in which 0.1% by mole of perfluoro(propyl vinyl ether) was copolymerized, average particle size after granulation: 25 $\mu$m). Then thereto was added 480 g of an aqueous solution containing a nonionic surfactant, e.g. Puronon #208 (Segmented oxypropylene-oxyethylene glycol available from NOF Corporation) in an amount shown in Table 1. With the above-mentioned number of rotations being maintained, the aqueous solution containing the surfactant was made compatible with the PTFE powder over 5 minutes.

Subsequently with the number of rotations of the side plate and agitator being maintained at 1,000 rpm and 450 rpm, respectively, a jacket was steam-heated to heat a product in the granulator to 70° C. over 20 minutes, followed by granulation.

Then the product was taken out and dried at 165° C. for 16 hours in an electric oven to give a PTFE granular powder. After weighing the product (hereinafter referred to as "obtained weight"), the following tests were carried out. Yield was calculated in the manner mentioned below.

Yield: A ratio of the obtained weight to the PTFE powder which was charged in the granulator was represented by a weight percentage. Apparent density: Measured according to JIS K 6891-5.3. Flowability: Measured in accordance with the method described in JP-A-3-259925.

Figure 3:
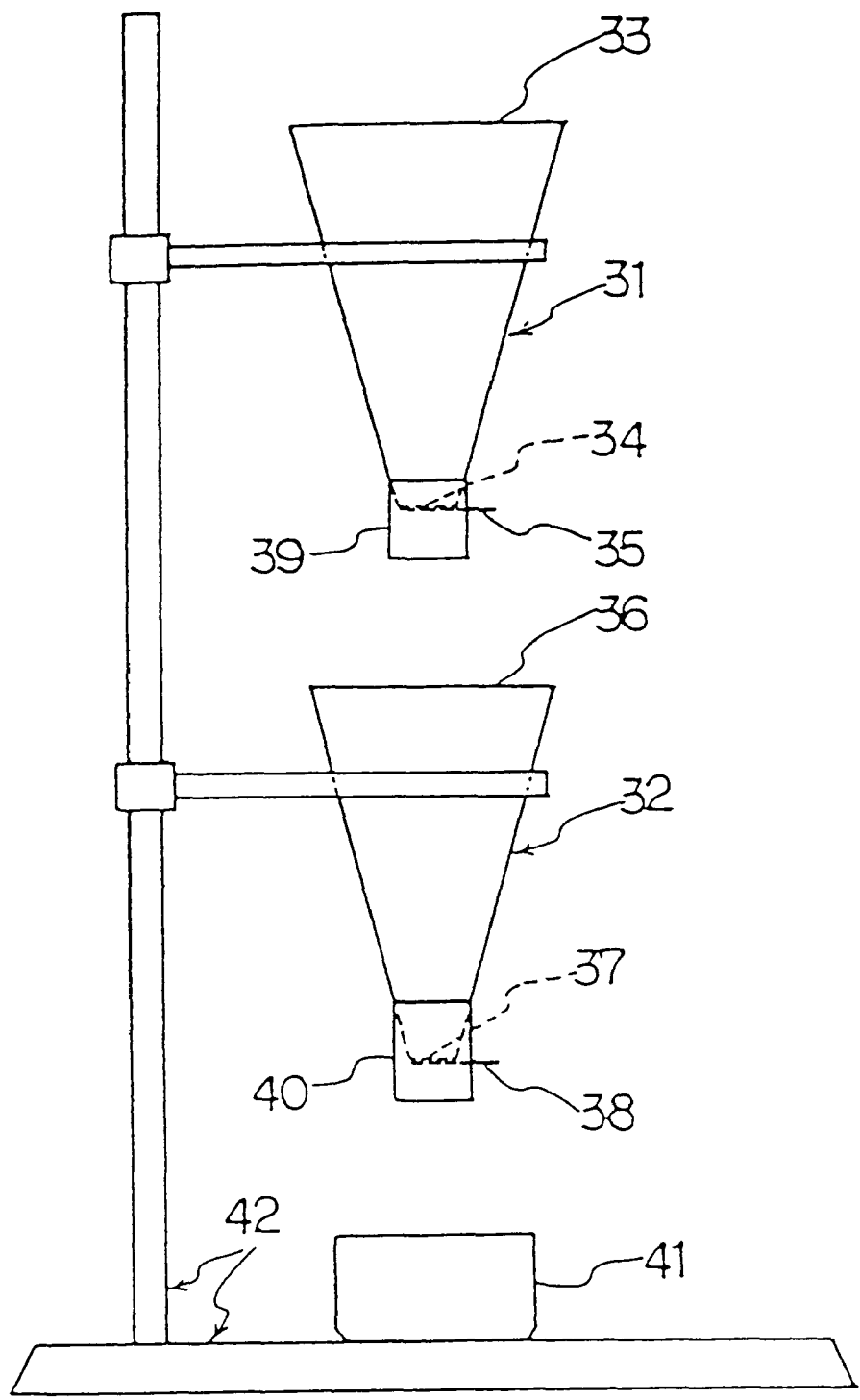
FIG. 3 is a diagrammatic view of an apparatus used for determining flowability of the granular powder in the present invention.

Namely, there is used a measuring device comprising a support base 42, an upper hopper 31 and a lower hopper 32. The both hoppers are aligned on their center lines and supported on the support base 42 as shown in FIG. 3 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 3, numerals 39 and 40 represent outlet covers of each hopper, and numeral 41 represents a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 µm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether or not the powder is dropped from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good". In case where the powder is never dropped, the flowability of the powder is estimated to be "Not good". In case where in three series of the dropping test, the powder has been dropped only one time, the dropping test is further conducted twice, and when the two series of the dropping test are both satisfactory, the flowability is estimated to be "Good". In other cases, the flowability is estimated to be "Not good".

(III) With respect to the powder estimated to be "Good", the upper hopper is charged with two cups of powder by using the same 30 cc cup, and the dropping test of the powder is conducted in the same manner as above. When as a result, the flowability is estimated to be "Good", the number of cups filled with the powder is increased successively and the dropping test is continued until the flowability is estimated to be "Not good". The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average particle size and particle size distribution of granular powder: Standard sieves of 10, 20, 32, 48 and 60 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Also percents by weight of the granular powder remaining on each sieve of 10, 20, 32, 48 and 60 meshes are regarded as the particle size distribution.

Tensile strength (hereinafter may be referred to as "TS") and elongation (hereinafter may be referred to as "EL"): A die having an inner diameter of 100 mm is charged with 25 g of powder, and a pressure is applied gradually over about 30 seconds until the final pressure becomes about 300 kg/cm². Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-5.8 by stretching at a stretching rate of 200 mm/min with an autograph having a gross weight of 500 kg.

Electrostatic charge: Handy Electrostatic Meter SFM775 available from Ion Systems, Inc. is used to determine an electrostatic charge. Z value (whiteness): A 50 mm diameter die was filled with 200 g of a granular powder which was then maintained at a molding pressure of 300 kg/cm² for five minutes. The obtained pre-molded article (diameter: about 50 mm, thickness: 50 mm) was heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (center portion). Then the Z value on the center of the cut portion was measured through Z value measuring method of the XYZ calorimetric system of Commission International de Leclairage.

The results are shown in Table 1.

EXPERIMENTAL EXAMPLES 3 and 4

A filler-containing PTFE granular powder was prepared in the same manner as in Experimental Example 1 except that a mixture powder of 1,080 g of a PTFE powder (POLYFLON M-111 available from DAIKIN INDUSTRIES, LTD.) and 120 g of a glass fiber surface-treated with an aminosilane coupling agent (EPG40M-10A available from Nippon Denki Glass Kabushiki Kaisha, average diameter: 12 µm, average fiber length: 80 µm) was used instead of the PTFE powder only. After determining the obtained weight, the tests were carried out in the same manner as in Experimental Example 1. The results are shown in Table 1. A molding pressure at the time when measuring a Z value was 500 kg/cm².

EXPERIMENTAL EXAMPLE 5

A 10-liter rotating disc type granulator (High Speed Mixer FS-10 available from Fukae Kogyo Kabushiki Kaisha) was charged with 1,000 g of a PTFE powder (POLYFLON M-111 available from DAIKIN INDUSTRIES, LTD.). While rotating the disc and pulverizer at the number of rotations mentioned above, 480 g of an aqueous solution of Puronon #208 having a concentration shown in Table 1 was added over 30 seconds and was made compatible with the mixture powder over 5 minutes.

Subsequently while rotating the disc and pulverizer at 200 rpm and 50 rpm, respectively, a jacket of the granulator was steam-heated to heat a product in the granulator to a temperature around 70° over 20 minutes for granulation.

Then the product was taken out and dried at 165° C. for 16 hours in an electric oven to give the PTFE granular powder. The tests were carried out in the same manner as in Experimental Example 1. The results are shown in Table 1.

TABLE 1

|  | Ex. 1 | Ex. 2 | Ex. 3 | Ex. 4 | Ex. 5 |
|---|---|---|---|---|---|
| Kind of filler | None | None | Glass fiber powder | Glass fiber powder | None |
| Surfactant |  |  |  |  |  |
| Kind | Puronon #208 | Puronon #208 | Puronon #208 | Puronon #208 | Puronon #208 |
| Concentration in an aqueous solution (% by weight) | 4 | 8 | 4 | 8 | 4 |
| Apparent density (g/ml) | 0.85 | 0.83 | 0.881 | 0.880 | 0.83 |
| Flowability (times) | 8 | 8 | 8 | 8 | 8 |
| Particle size distribution (% by weight) |  |  |  |  |  |
| 10 on | 1.8 | 0.0 | 1.0 | 1.5 | 2.4 |
| 20 on | 32.6 | 7.4 | 18.6 | 16.9 | 30.2 |
| 32 on | 32.8 | 63.4 | 38.0 | 35.7 | 55.2 |
| 48 on | 24.8 | 27.8 | 30.2 | 30.3 | 10.9 |
| 60 on | 5.0 | 0.8 | 5.2 | 5.9 | 0.6 |
| 60 pass | 3.0 | 0.4 | 7.1 | 9.7 | 0.6 |
| Average particle size of PTFE powder after granulation (μm) | 650 | 580 | 570 | 540 | 740 |
| Obtained weight (g) | 1185 | 1190 | 1185 | 1180 | 920 |
| Yield (%) | 98.8 | 99.2 | 98.8 | 98.3 | 92.0 |
| TS (kgf/cm$^2$) | 383 | 381 | 226 | 228 | 363 |
| EL (%) | 325 | 323 | 314 | 316 | 310 |
| Whiteness (Z value) | 111.0 | 111.1 | 95.2 | 94.1 | 111.0 |
| Electrostatic charge (V) | 3 | 0 | 2 | 0 | 3 |

In the column of the particle size distribution of Table 1, 10 on, 20 on, 32 on, 48 on and 60 on indicate the percentages of particles remaining on the 10 mesh, 20 mesh, 32 mesh, 48 mesh and 60 mesh sieves, respectively. And, 60 pass represents the percentage of the particles passed through the 60 mesh sieve.

As is evident from the results in Table 1, the (filler-containing) PTFE granular powder prepared by using a specific nonionic surfactant has a high apparent density, a small electrostatic charge and a superior flowability, and can give a molded article which is free from lowering of tensile strength and elongation and coloring attributable to the surfactant and has a high whiteness. Also a granular powder having a small number of coarse particles can be obtained by using, as means for applying a mechanical force, a rotating disc type granulator, particularly a granulator with a rotating side plate and a rotating inclined disc.

INDUSTRIAL APPLICABILITY

The PTFE granular powder of the present invention has a high apparent density, a small electrostatic charge and a superior powder flowability. And, the molded product obtained from the granular powder is free from lowering of tensile strength and elongation and coloring attributable to the surfactant and has a high whiteness (Z value).

Also, the preparation process of the present invention can provide the PTFE granular powder having superior physical properties as mentioned above at low cost and is free from a danger of a fire because no organic liquid need be used.

What is claimed is:

1. A process for preparing a polytetrafluoroethylene granular powder having an apparent density of not less than 0.60 g/ml and an electrostatic charge of not more than 50 V by granulation of a polytetrafluoroethylene powder; characterized in that 100 parts of the polytetrafluoroethylene powder is wetted with 30 to 60 parts of an aqueous solution containing a nonionic surfactant having a hydrophobic segment comprising a poly(oxyalkylene) unit having 3 or 4 carbon atoms and a hydrophilic segment comprising a poly(oxyethylene) unit and then a mechanical force is applied to the wetted polytetrafluoroethylene powder.

2. The process for preparing a polytetrafluoroethylene granular powder of claim 1, wherein the mechanical force is applied by tumbling.

3. The process for preparing a polytetrafluoroethylene granular powder of claim 1, wherein the polytetrafluoroethylene is a modified polytetrafluoroethylene prepared by copolymerizing 99 to 99.999% by mole of tetrafluoroethylene and 1 to 0.001% by mole of a perfluoro(vinyl ether) represented by:

wherein $R_f$ is a perfluoroalkyl group having 1 to 10 carbon atoms, a perfluoro(alkoxyalkyl) group having 4 to 9 carbon atoms, an organic group represented by the formula (V):

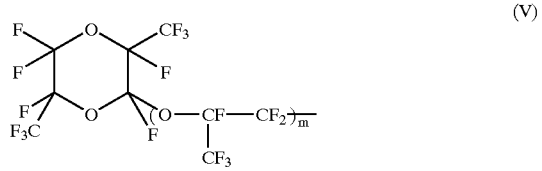

in which m is 0 or an integer of 1 to 4 or an organic group represented by the formula (VI):

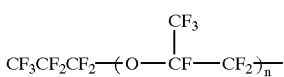

(VI)

in which n is an integer of 1 to 4.

4. A polytetrafluoroethylene granular powder prepared by the process of claim 1; characterized in that an apparent density of the granular powder is not less than 0.60 g/ml and an electrostatic charge of the granular powder is not more than 50 V.

5. The polytetrafluoroethylene granular powder of claim 4, wherein flowability of the granular powder is not less than 6 times.

6. The polytetrafluoroethylene granular powder of claim 4, wherein an average particle size of particles in the granular powder is from 400 to 1,000 μm.

7. The polytetrafluoroethylene granular powder of claim 4, which gives a molded article having a whiteness (Z value) of to less than 80.

8. A process for preparing a filler-containing polytetrafluoroethylene granular powder having an electrostatic charge of not more than 50 V by granulation of a polytetrafluoroethylene powder and a filler; characterized in that 100 parts of a mixture of polytetrafluoroethylene powder and filler is wetted with 30 to 60 parts of an aqueous solution containing a nonionic surfactant having a hydrophobic segment comprising a poly(oxyalkylene) unit having 3 or 4 carbon atoms and a hydrophilic segment comprising a poly(oxyethylene) unit and then a mechanical force is applied to the wetted mixture of polytetrafluoroethylene powder and filler.

9. The process for preparing a filler-containing polytetrafluoroethylene granular powder of claim 8, wherein the mechanical force is applied by tumbling.

10. The process for preparing a filler-containing polytetrafluoroethylene granular powder of claim 8, wherein the polytetrafluoroethylene is a modified polytetrafluoroethylene -prepared by copolymerizing 99 to 99.999% by mole of tetrafluoroethylene and 1 to 0.001% by mole of a perfluoro (vinyl ether) represented by:

wherein $R_f$ is a perfluoroalkyl group having 1 to 10 carbon atoms, a perfluoro(alkoxyalkyl) group having 4 to 9 carbon atoms, an organic group represented by the formula (V):

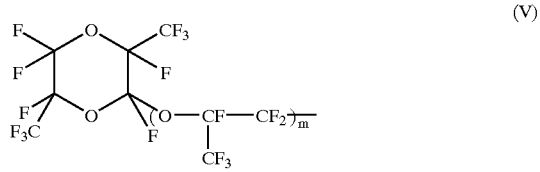

in which m is 0 or an integer of 1 to 4 or an organic group represented by the formula (VI):

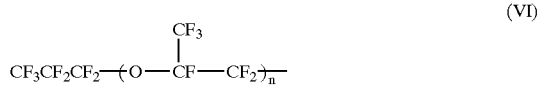

in which n is an integer of 1 to 4.

11. A filler-containing polytetrafluoroethylene granular power having an electrostatic charge of not more than 50 V and prepared by the process of claim 8.

12. The filler-containing polytetrafluoroethylene granular powder of claim 11, wherein flowability of the granular powder is not less than 6 times.

13. The filler-containing polytetrafluoroethylene granular powder of claim 11, wherein an average particle size of particles in the granular powder is from 400 to 1,000 μm.

14. The filler-containing polytetrafluoroethylene granular powder of claim 11, wherein the filler is a white or transparent filler and the granular powder gives a molded article having a whiteness (Z value) of not less than 80.

* * * * *